United States Patent
Post (10) Patent No.: US 6,249,319 B1
(45) Date of Patent: Jun. 19, 2001

(54) METHOD AND APPARATUS FOR FINDING A CORRECT SYNCHRONIZATION POINT WITHIN A DATA STREAM

(75) Inventor: Lauren L. Post, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,274

(22) Filed: Mar. 30, 1998

(51) Int. Cl.7 .................................................. H04N 9/475
(52) U.S. Cl. .......................... 348/515; 348/512; 348/500; 348/423.1; 348/425.4
(58) Field of Search ..................................... 348/515, 512, 348/513, 500, 516, 423.1, 425.4; 375/240.28, 355; 370/509, 510, 511, 512, 513, 514; 386/4, 5, 12, 52, 54, 55; H04N 9/475

(56) References Cited

U.S. PATENT DOCUMENTS

| | | | |
|---|---|---|---|
| 5,570,372 | * 10/1996 | Shaffer | 348/515 |
| 5,642,171 | * 6/1997 | Baumgartner et al. | 348/515 |
| 5,802,245 | * 9/1998 | Kunihiro | 386/98 |
| 5,815,634 | * 9/1998 | Daum et al. | 386/96 |
| 5,959,684 | * 9/1999 | Tan et al. | 348/515 |
| 5,982,447 | * 11/1999 | Nakamura | 348/515 |
| 5,999,692 | * 12/1999 | Schmidt et al. | 386/54 |
| 6,016,380 | * 1/2000 | Norton | 386/52 |

* cited by examiner

Primary Examiner—Reinhard J. Eisenzopf
Assistant Examiner—Jean W. Desir
(74) Attorney, Agent, or Firm—Duke W. Yee; Jeffrey S. LaBaw (57) ABSTRACT

A method in a data processing system for locating a correct synchronization point in a data stream containing a plurality of video data packets and a plurality of audio data packets. A data stream is monitored for an audio synchronization factor within an audio data packet and for a video synchronization factor within a video data packet. In response to detecting a video synchronization factor in the video data packet, a first audio data packet from the plurality of audio data packets after the video data packet is examined to determine whether the first audio data packet contains an audio synchronization factor. In response to detecting an audio synchronization factor in the audio data packet, a data packet immediately following the audio data packet is examined to determine whether the data packet is a video data packet containing a video synchronization factor. The synchronization point is located in the video data packet in response detecting an audio synchronization factor in the first audio data packet after the video data packet containing the video synchronization factor. The synchronization point is located in the audio data packet in response to detecting the video synchronization factor in a video data packet immediately after the audio data packet. The synchronization point is used to set a start point to begin presentation of the audio and video data from the data stream.

30 Claims, 11 Drawing Sheets

METHOD AND APPARATUS FOR FINDING A CORRECT SYNCHRONIZATION POINT WITHIN A DATA STREAM

BACKGROUND OF THE INVENTION

1. Technical Field

The present invention relates generally to an improved data processing system and in particular to a method and apparatus for managing processing of a data stream in a data processing system. Still more particularly, the present invention relates to a method and apparatus for finding a synchronization point in a data stream.

2. Description of Related Art

Multimedia, the presentation or transfer of information through more than one medium at any time, is a fast growing segment of the computer industry with many applications being developed, which incorporate various features of multimedia. Additionally, many businesses are using multimedia to present information to consumers. Multimedia combines different forms of media in the communication of information to a user through a data processing system, such as a personal computer. A multimedia application is an application that uses different forms of communications within a single application. For example, multimedia applications may communicate data to a user through a computer via audio and video simultaneously. Such multimedia applications are usually bit intensive, real time, and very demanding, requiring ample processing power in the data processing system. Users may access in the multimedia, for example, in the form of video games or movies on a digital video disk (DVD) or through a communications link. Multimedia also is becoming prevalent on the Internet. Many web sites provide multimedia to users visiting the web sites. Additionally, multimedia in the form of videos also are available to users through the Internet.

In providing video from a video server to users in a video on demand format, problems occur when interrupting an MPEG data stream being broadcast and trying to find a correct synchronization point within the MPEG data stream in which to start both audio and video in sync. Presentation of the MPEG data stream may start anywhere, but then audio and video will, in most cases, be out of sync. An MPEG data stream including both video and audio data will have data packets that may be either audio data packets, video data packets, or miscellaneous data packets. For video, some data packets may contain a delta of data based on previous data. To cleanly start presentation of video in an MPEG data stream, a sequence header start for the video must be located. For audio, a correct synchronization point will be an audio packet, which contains a sync word. Thus, synchronization points may be found in both video data packets and audio data packets. A problem exists in selecting the correct synchronization point between both audio and video data packets.

Therefore, it would be advantageous to have an improved method and apparatus for locating a correct synchronization point in a data stream for starting presentation of data.

SUMMARY OF THE INVENTION

It is one object of the present invention to provide an improved data processing system.

It is another object of the present invention to provide a method and apparatus for managing processing of a data stream in a data processing system.

It is yet another object of the present invention to provide a method and apparatus for finding a synchronization point in a data stream.

The present invention provides a method in a data processing system for locating a correct synchronization point in a data stream containing a plurality of video data packets and a plurality of audio data packets. A data stream is monitored for an audio synchronization factor within an audio data packet and for a video synchronization factor within a video data packet. In response to detecting a video synchronization factor in the video data packet, a first audio data packet from the plurality of audio data packets after the video data packet is examined to determine whether the first audio data packet contains an audio synchronization factor.

In response to detecting an audio synchronization factor in the audio data packet, a data packet immediately following the audio data packet is examined to determine whether the data packet is a video data packet containing a video synchronization factor. The synchronization point is located in the video data packet in response to detecting an audio synchronization factor in the first audio data packet after the video data packet containing the video synchronization factor. The synchronization point is located in the audio data packet in response to detecting the video synchronization factor in a video data packet immediately after the audio data packet. The synchronization point is used to set a start point to begin presentation of the audio and video data from the data stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
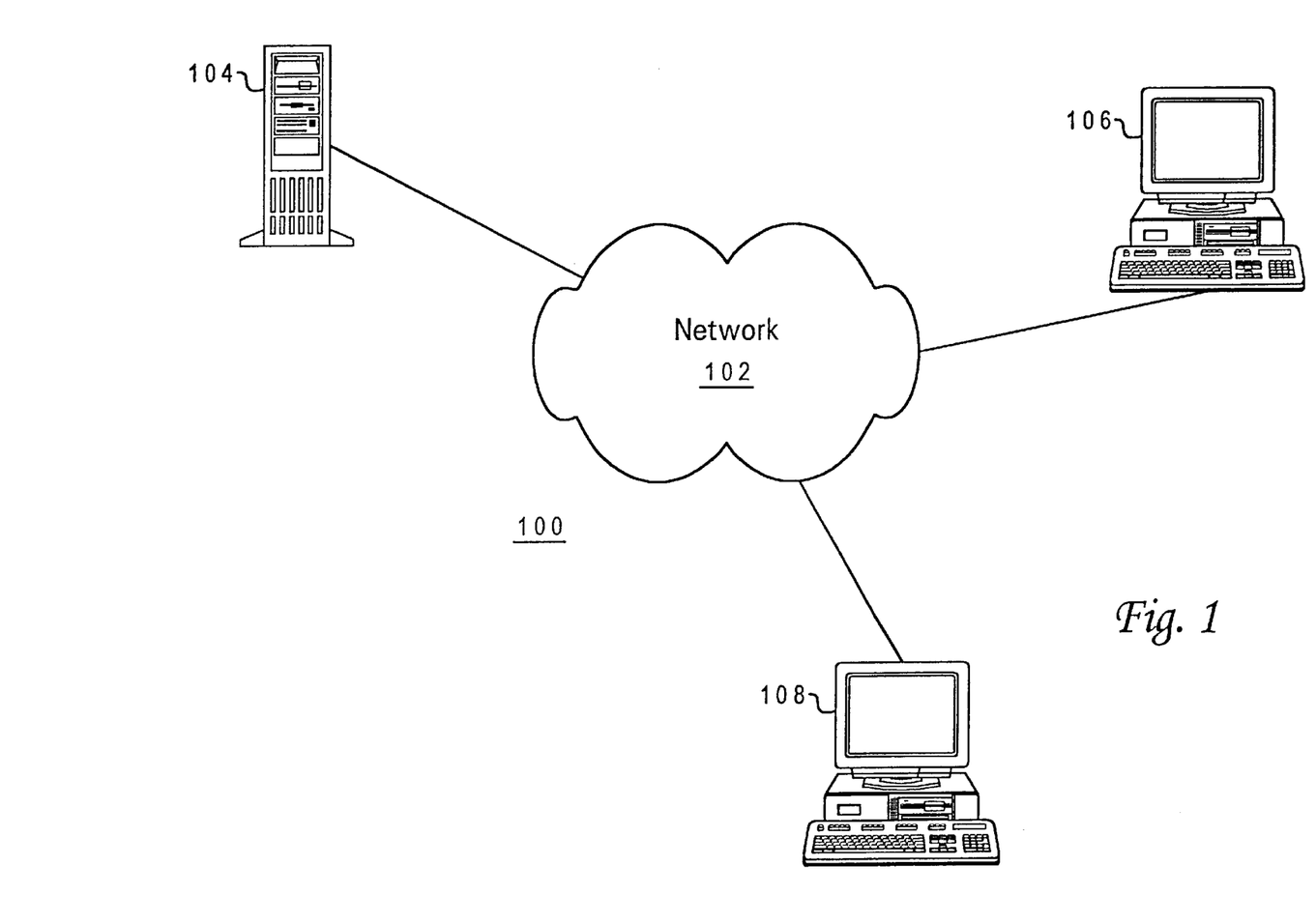
FIG. 1 is an illustration of a distributed data processing system in which the present invention may be implemented.

With reference now to the figures, and in particular with reference to FIG. 1, an illustration of a distributed data processing system is depicted in which the present invention may be implemented. Distributed data processing system 100 includes a network 102 for providing communication and data transfer between data processing systems 104, 106, and 108. In the depicted example, network 102 is the Internet, which is a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Data processing system 104 is a video server that provides video to data processing systems 106 and 108. The video is in the form of an MPEG data stream sent from data processing system 104 to data processing systems 106 and 108 using network 102.

Figure 2:
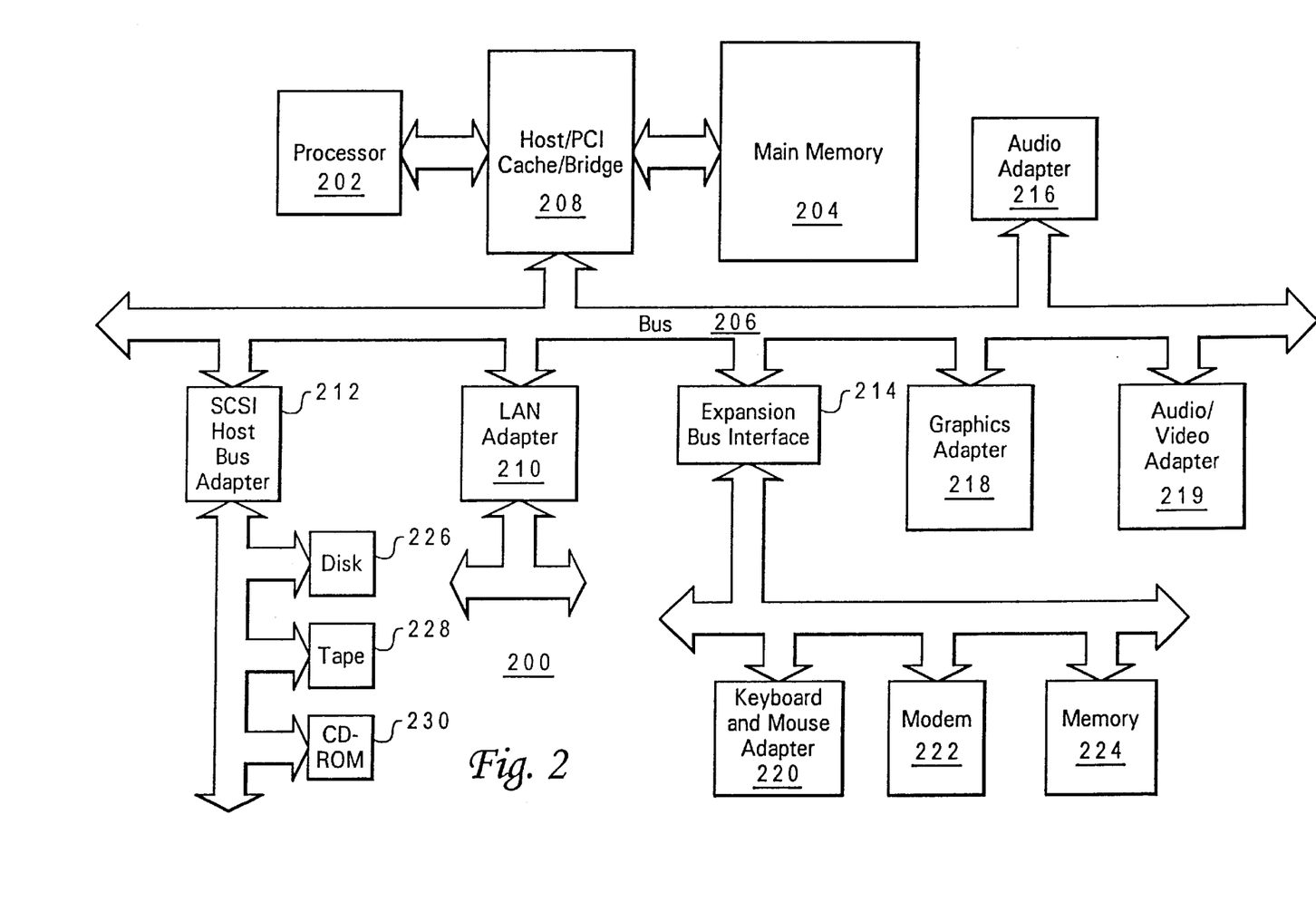
FIG. 2 is a block diagram of a data processing system in which the present invention may be implemented.

Turning next to FIG. 2, a block diagram of a data processing system 200 in which the present invention may be implemented is illustrated. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention.

Figure 3:
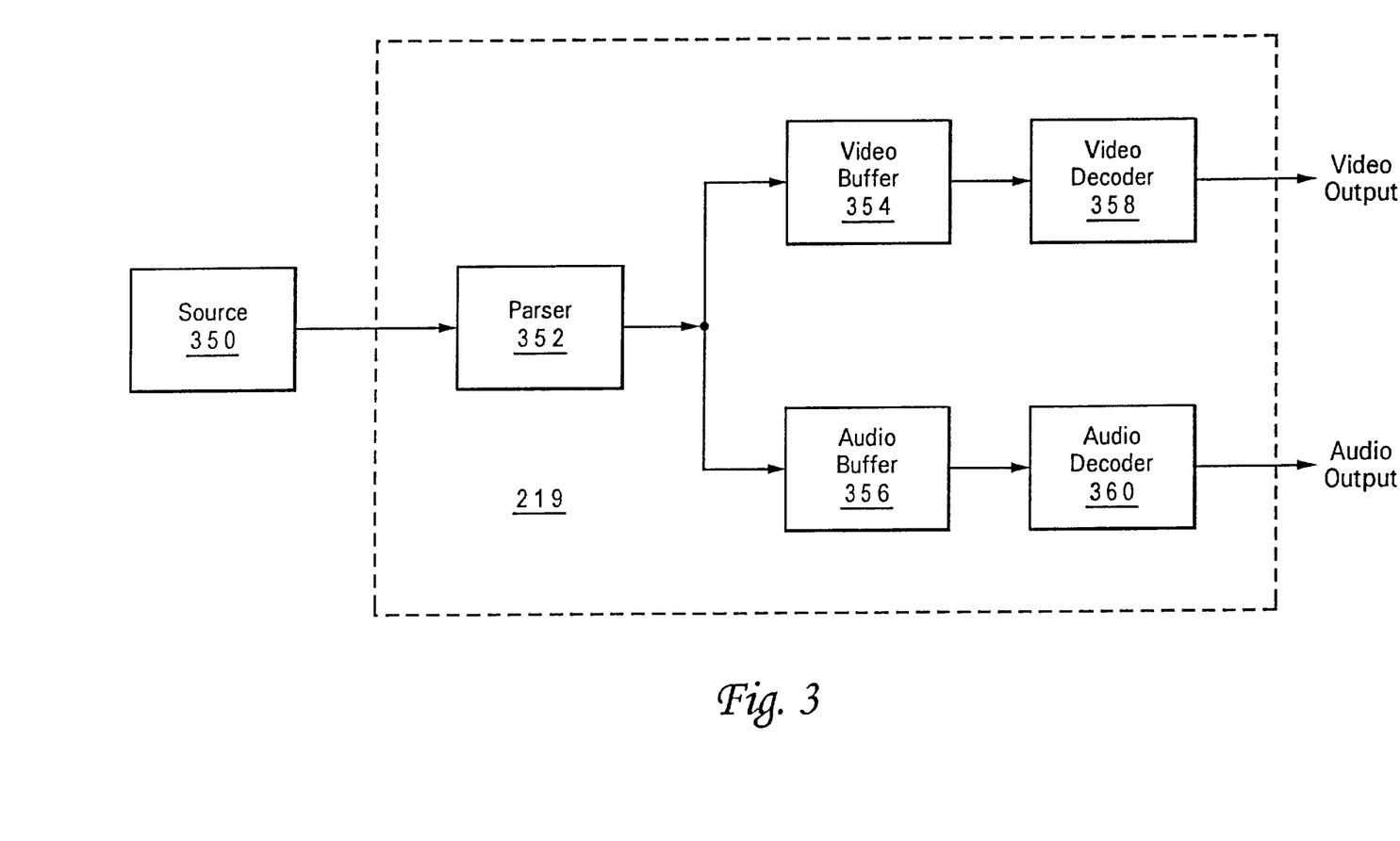
FIG. 3 is a block diagram of an audio/video adapter depicted from FIG. 2 in accordance with a preferred embodiment of the present invention.

In FIG. 3, a block diagram of an audio/video adapter is depicted from FIG. 2 according to the present invention. A/V adapter 219 is a multimedia adapter that has an input connected to source 350, which may be a digital storage media, such as hard disk drive 226 or CD30 ROM 230. Alternatively, source 350 may be a data stream from a remote source received through LAN adapter 210. Parser 352 separates video data from audio data with video data being sent to video buffer 354 and audio data being sent to audio buffer 356. Parser 352 places video data into video data packets and audio data into audio data packets with these data packets being sent to video buffer 354 and audio buffer 356, respectively. Video decoder 358 is employed to synchronize and decode or drop video frames to produce a video output. Audio decoder 360 is employed to decode audio to create an audio output for the multimedia presentation. The decoding performed by A/V adapter 219 may be implemented using the MPEG standard. The processes of the present invention may be implemented within A/V adapter 219.

Figure 4A:
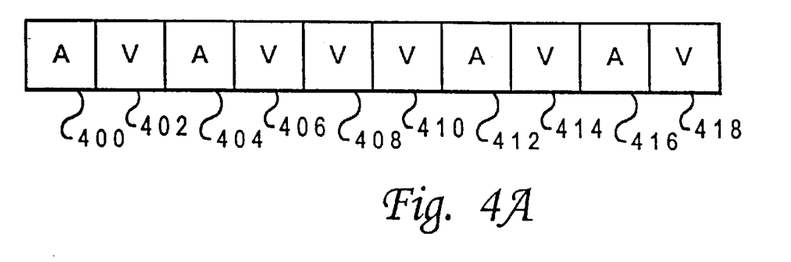
FIG. 4A is an illustration of data packets parsed from an MPEG data stream in accordance with a preferred embodiment of the present invention.
Figure 4B:
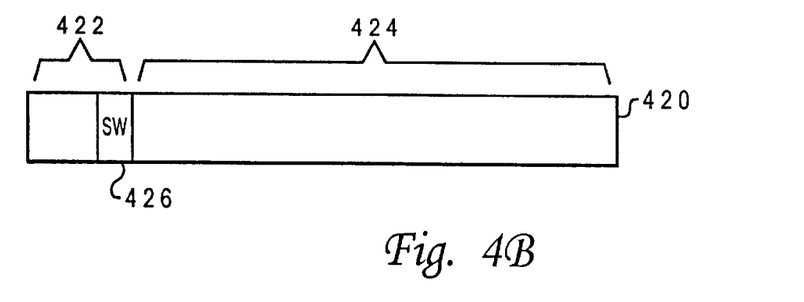
FIG. 4B is an illustration of an audio data packet containing an audio synchronization factor in accordance with a preferred embodiment of the present invention.

The present invention provides a system, method, and computer readable medium for finding a correct synchronization point within a data stream, such as, an MPEG video/audio data stream. The processes of the present invention may be implemented within a data processing system receiving and presenting the data stream. FIG. 4A is an illustration of data packets parsed from an MPEG data stream. In the depicted example, data packets 400–418 are generated by parser 352 separating video data from audio data. Data packets 400, 404, 412, and 416 are audio data packets while data packets 402, 406–410, 414, and 418 are video data packets. In determining a correct synchronization point to start presentation of audio and video data, both audio and video data packets are examined. An audio data packet is examined to determine whether an audio synchronization factor is present. A video data packet is examined to determine whether a video synchronization factor is present. For audio data in the preferred embodiment of MPEG, a synchronization point is an audio packet that contains an audio synchronization factor in the form of a sync word "Ox FFF", which is 12 bits of one. For example, in FIG. 4B, an audio data packet 420 is illustrated in which audio data packet includes a packet header 422, and a payload 424. Audio data packet 420 contains a sync word (SW) 426 within packet header 422 in the depicted example. A sync word means that a header has been found for audio data, which is a synchronization point.

Figure 4C:
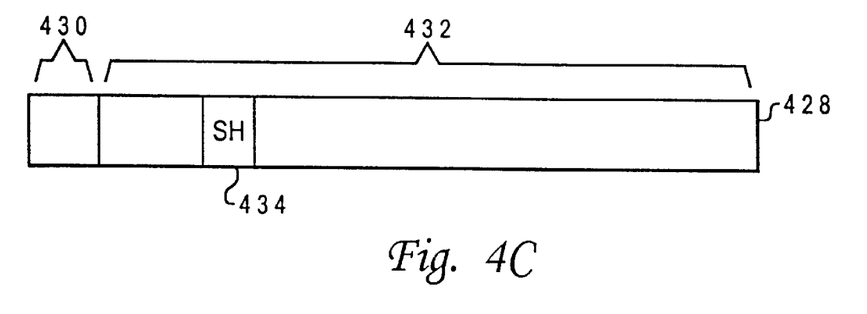
FIG. 4C is an illustration of a video data packet containing a video synchronization factor in accordance with a preferred embodiment of the present invention.
Figure 4D:
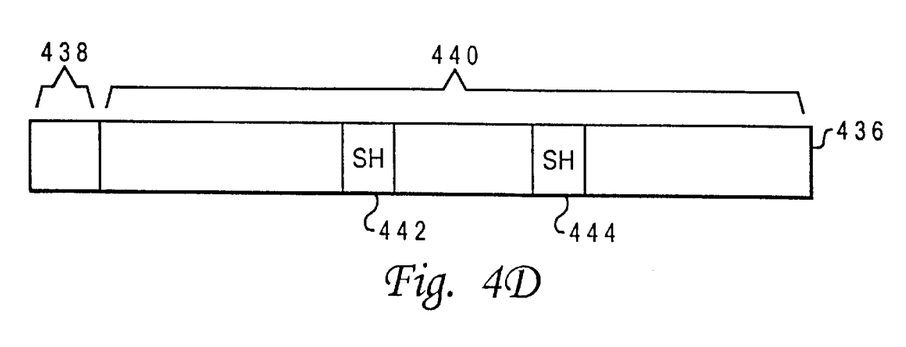
FIG. 4D is an illustration a video data packet containing two synchronization factors in accordance with a preferred embodiment of the present invention.

For video, a sequence header (SH) is the video synchronization factor required as a starting point to cleanly start presentation of video data. A video data packet 428 contains a packet header 430 and a payload 432 in FIG. 4C. A sequence header 434 is found within payload 432 of video data packet 428. In some cases, a video data packet may contain more than one sequence header as shown in FIG. 4D. Video data packet 436 in FIG. 4D includes a packet header 438 and a payload 440 in which payload 440 contains two sequence headers, sequence header 442 and sequence header 444. Not every video data packet will necessarily have a sequence header. A sequence header indicates the beginning of a video sequence, which is a synchronization point.

In the depicted example, each data packet is examined in a sequential manner in which an audio data packet containing a sync word must be immediately followed by a video data packet containing a sequence header. Otherwise, a video data packet containing a sequence header must be following by an audio data packet containing a sync word. Alternatively, the processes of the present invention may monitor for a video packet with a sequence header and then look either forward or backward for the next audio packet that contains a sync word. The audio data packet, containing a sync word, must be (1) immediately before a video data packet, containing a sequence header or (2) the first audio packet after the sequence header, meaning that video data packets may be located after the video data packet containing a sequence header but before the audio data packet containing a sync word. If a video data packet with a sequence header does not have an audio data packet with a sync word located immediately before the video data packet or as the first audio data packet after the video data packet, the video data packet is skipped until one meeting the requirements is found.

In the depicted example, if video data packet 402 contains a sequence header and audio data packet 400 contains a sync word, a correct synchronization point is found in audio data packet 400. If video data packet 402 does not contain a sequence header, then these data packets are skipped. If video data packet 406 has a sequence header and video data packets 408 and 410 do not contain a sequence header and if a sync word is found in audio data packet 412 (the first audio data packet after video data packet 406), a correct synchronization point is found within video data packet 406. In this example, if video data packet 406 contains more than one sequence header, the last sequence header in video data packet 406 is selected as the correct synchronization point. In the case that video data packet 410 also contains a sequence header, video data packet 406 is no longer the data packet containing the correct synchronization point.

Figure 5:
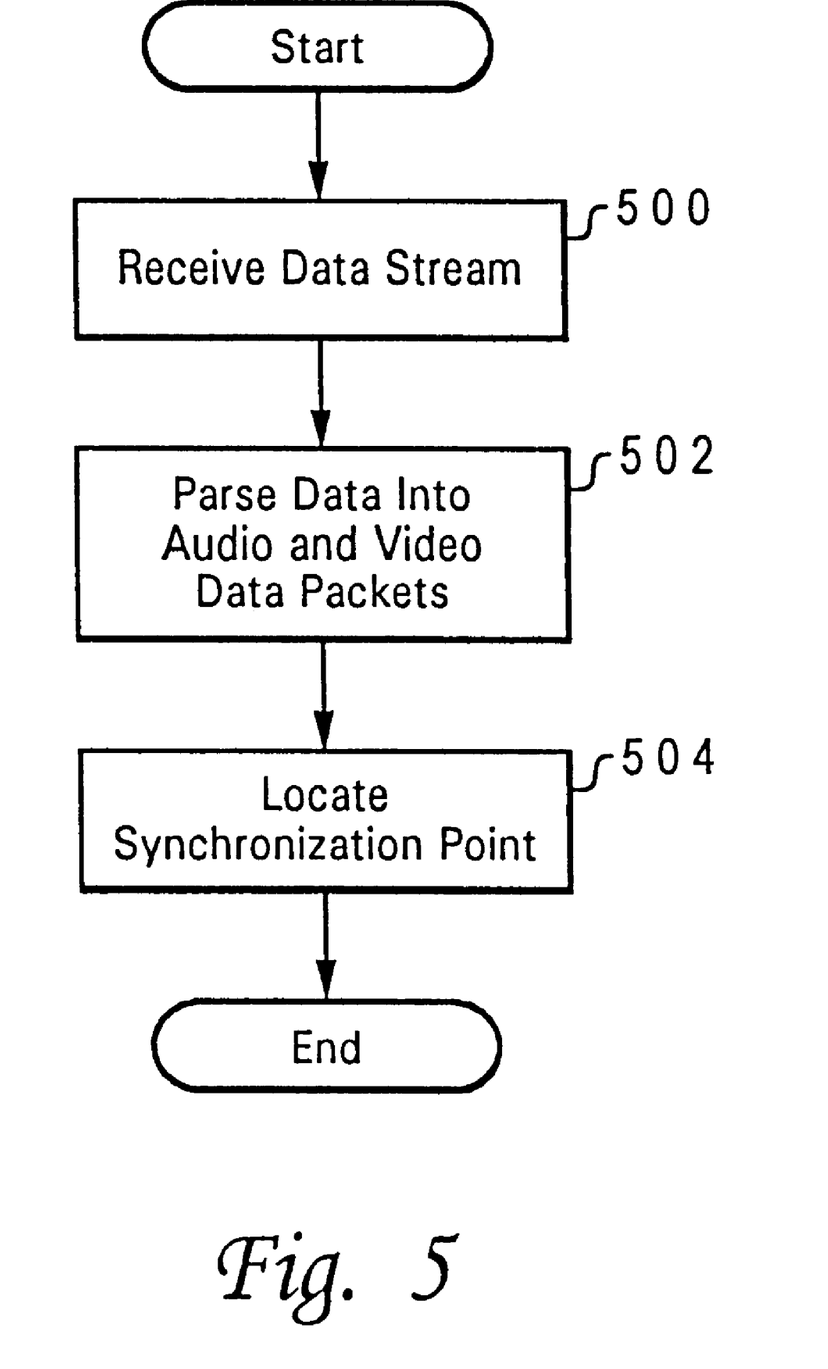
FIG. 5 is a high level flowchart of a process for synchronizing a data stream in accordance with a preferred embodiment of the present invention.

Turning now to FIG. 5, a high level flowchart of a process for synchronizing a data stream is depicted in accordance with a preferred embodiment of the present invention. The process begins by receiving a data stream (step 500). Thereafter, data in the data stream is parsed into audio and video data packets (step 502). A synchronization point is located from the data packets (step 504).

Figure 6:
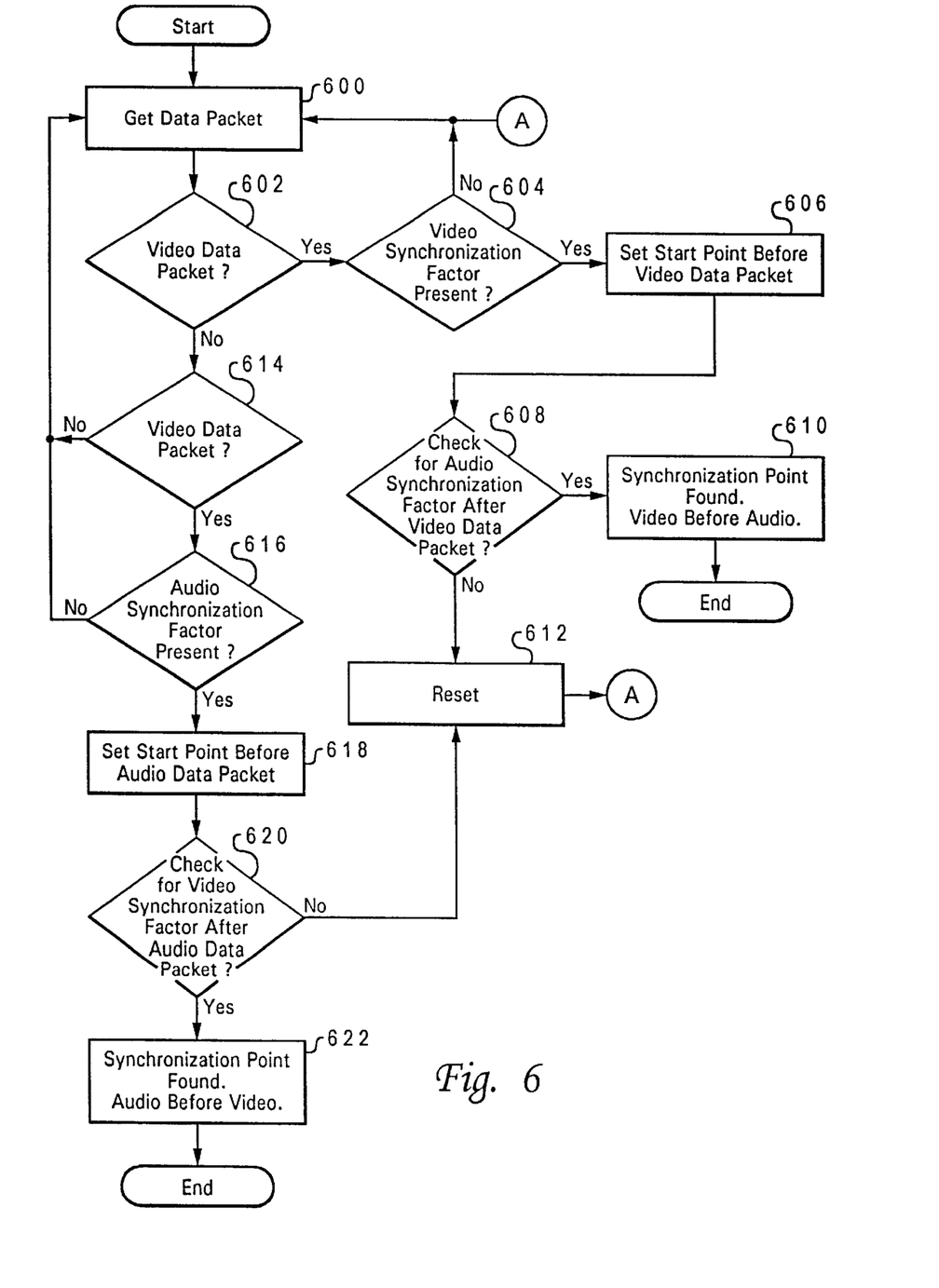
FIG. 6 is a flowchart of a process for examining data packets to find a correct synchronization point in accordance with a preferred embodiment of the present invention.

Turning next to FIG. 6, a flowchart of a process for examining data packets to find a correct synchronization point is depicted in accordance with a preferred embodiment of the present invention. The process begins by obtaining a data packet (step 600). A determination is made as to whether the data packet is a video data packet (step 602). If the data packet is a video data packet, a determination is then as to whether a video synchronization factor is present (step 604). If a video synchronization factor is absent from the video data packet, the process returns to step 600 to obtain another data packet. Otherwise, the process sets a start point before the video data packet (step 606). Next, a determination is made as to whether an audio synchronization factor is found in the first audio data packet after the video data packet (step 608). If an audio synchronization factor is found in the first audio data packet after the video data packet, the synchronization point for the data stream is found as being in the video data packet containing the synchronization factor located before the audio data packet containing the synchronization factor (step 610) with the process terminating thereafter.

With reference back to step 608, if an audio synchronization factor is not found in the first audio data packet after the video data packet containing the video synchronization factor, the start point is reset (step 612) with the process then returning to step 600 to obtain another data packet.

With reference again to step 602, if the data packet is not a video data packet, the process then determines whether the data packet is an audio data packet (step 614). If the data packet is not an audio data packet, the process returns to step 600 to obtain another data packet. Otherwise, the process determines whether an audio synchronization factor is present in the audio data packet (step 616). If an audio synchronization factor is absent, the process returns to step 600. The presence of an audio synchronization factor results in a start point being set before the audio packet (step 618). The process then checks to see whether a video synchronization factor is found in a data packet immediately after the audio data packet in which the audio data synchronization factor is located (step 620). A presence of a video synchronization factor in the data packet immediately following the audio data packet means that this data packet is a video data packet. If a video synchronization factor is present in the data packet immediately following the audio data packet, the synchronization point is found as being located in the audio data packet containing the audio synchronization factor before the video data packet containing the video synchronization factor (step 622). Otherwise, the process returns to step 612 to reset the start point.

Figure 7:
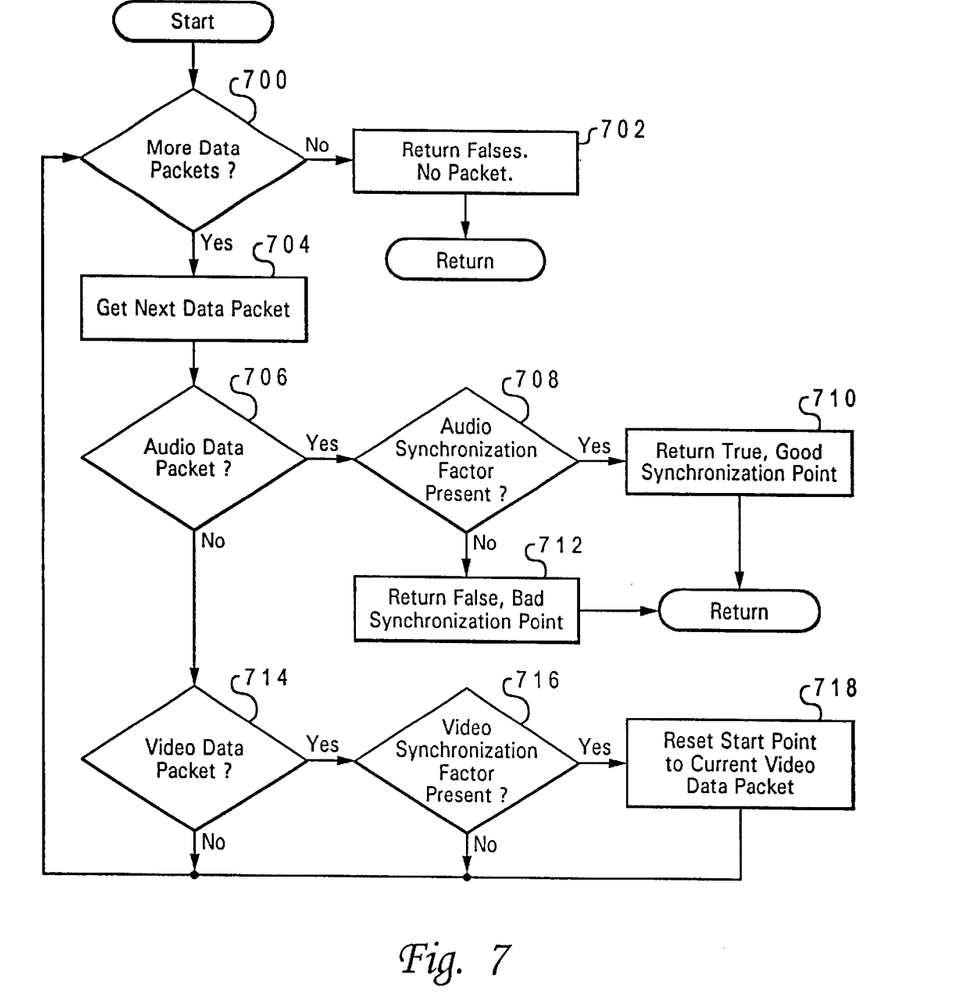
FIG. 7 is a flowchart of a process for locating a synchronization point for video data in accordance with a preferred embodiment of the present invention.

With reference now to FIG. 7, a flowchart of a process for locating a synchronization point for video data is depicted in accordance with a preferred embodiment of the present invention. This process is employed to find the next audio data packet containing a synchronization factor, a sync word in the depicted example. FIG. 7 is a more detailed description of step 608 in FIG. 6. The process begins by determining whether additional data packets are present (step 700). If no additional data packets are present, the process returns a false indication indicating that no other synchronization factor is to be found after the video synchronization factor (step 702). If additional data packets are present, the process obtains the next data packet (step 704).

A determination is then made as to whether the data packet is an audio data packet (step 706). If the data packet is an audio data packet, a determination is made as to whether an audio synchronization factor is present in the audio data packet (step 708). With respect to an MPEG data stream, the audio synchronization factor is a sync word located in the packet header. If a synchronization factor is present, a true indication is returned, which indicates that the synchronization point is a good one (step 710) with the process then returning. Otherwise, a false indication is returned indicating that the synchronization point in the video data packet is a bad one (step 712).

With reference again to step 706, if the data packet is not an audio data packet, a determination is made as to whether the data packet is a video data packet (step 714). If the data packet is not a video data packet, the process returns to step 700 as described above. Otherwise, a determination is made as to whether a video synchronization factor is present in the video data packet (step 716). If a video synchronization factor is not present in the video data packet, the process then returns to step 700 as described above. If, however, a video synchronization factor is present in the video data packet, the start point is reset to a point before the new synchronization factor found in the video data packet (step 718) with the process then returning to step 700.

Figure 8:
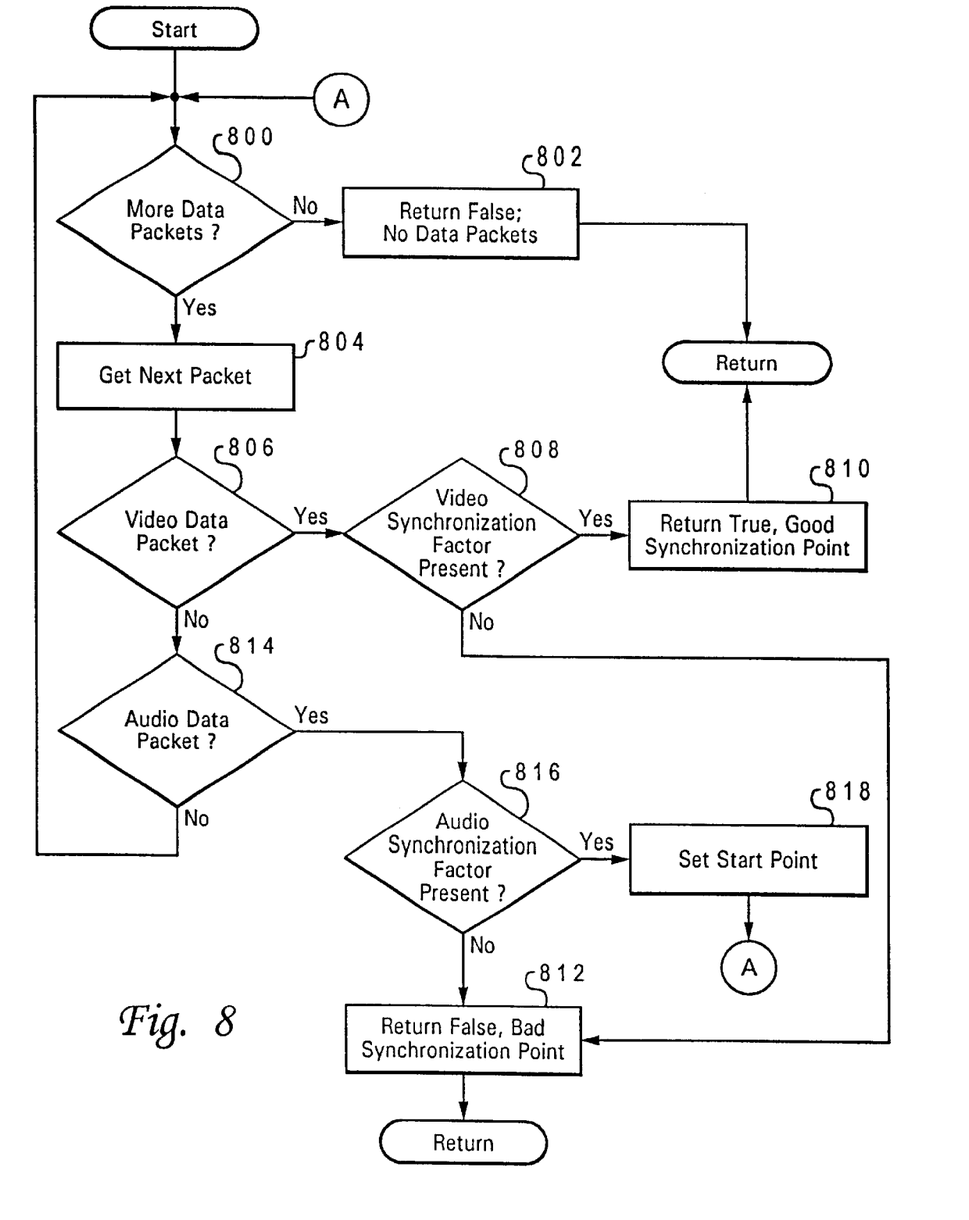
FIG. 8 is a flowchart of a process for locating a synchronization point in a video data packet following an audio data packet with a sync word in accordance with a preferred embodiment of the present invention.

With reference next to FIG. 8, a flowchart of a process for locating a synchronization point for video data after audio data packet is depicted in accordance with a preferred embodiment of the present invention. This process is employed to find the next video data packet containing a synchronization factor, a sequence header in the depicted example. FIG. 8 is a more detailed description of step 620 in FIG. 6. The process begins by determining whether additional data packets are present (step 800). If no additional data packets are present, the process returns a false indication indicating that no other synchronization factor is to be found after the video synchronization factor (step 802). If additional data packets are present, the process contains the next data packet (step 804).

Next, a determination is then made as to whether the packet is a video packet (step 806). If the data packet is a video data packet, a determination is made as to whether a video synchronization factor is present in the video data packet (step 808). With respect to an MPEG data stream, the video synchronization factor is a sequence header located in the video data packet. If a synchronization factor is present, a true indication is returned, which indicates that the synchronization point is a good one (step 810). Otherwise, a false indication is returned indicating that the synchronization point in the audio data packet is a bad one (step 812).

With reference again to step 806, if the data packet is not a video data packet, a determination is then made as to whether the data packet is an audio data packet (step 814). If the data packet is not an audio data packet, the process returns to step 800. Otherwise, a determination is made as to whether an audio synchronization factor is present in the audio data packet (step 816). If an audio synchronization factor is present in the audio data packet, the start point is set to the current audio data packet (step 818) with the process then returning to step 800 as described above. On the other hand, if the audio data packet does not contain a synchronization factor, the process then proceeds to step 812 as described above.

Figure 9:
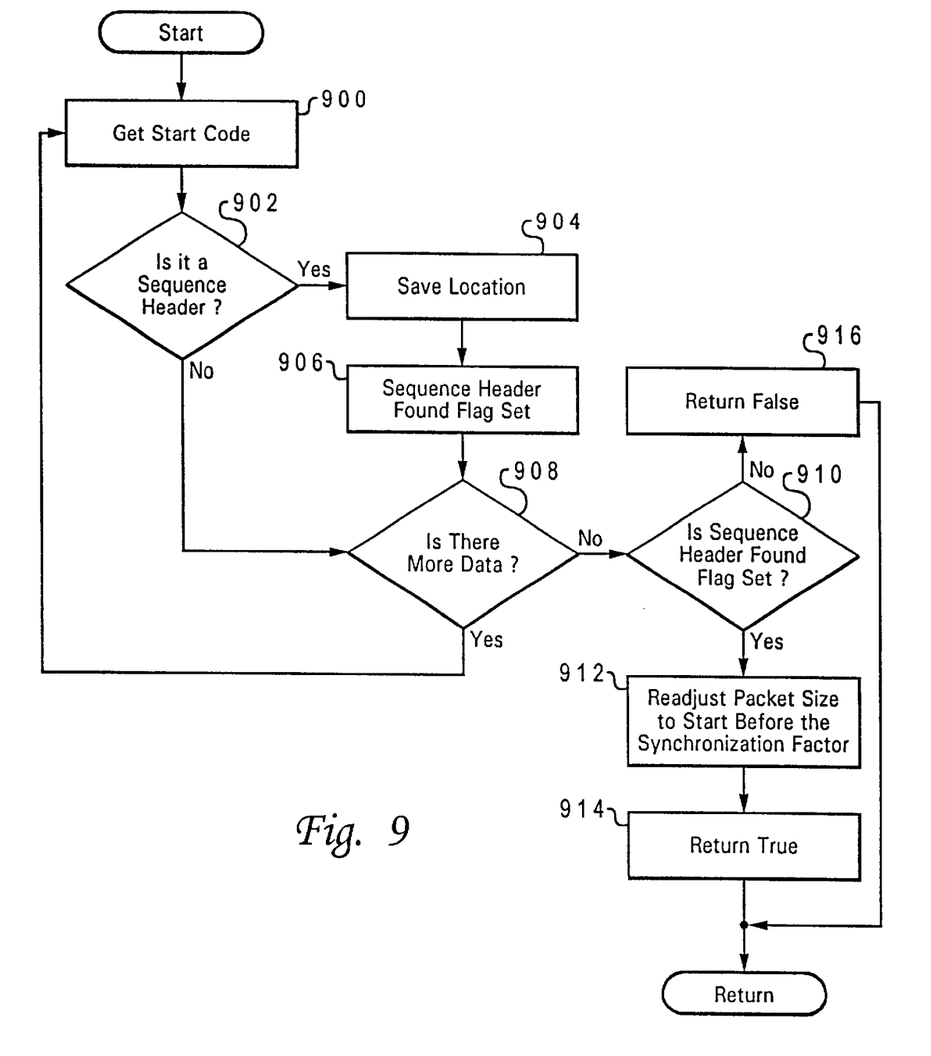
FIG. 9 is a flowchart of a process for examining a video data packet for the last synchronization factor in the packet in accordance with a preferred embodiment of the present invention.

With reference now to FIG. 9, a flowchart of a process for examining a video data packet for the last synchronization factor in the data packet is depicted in accordance with a preferred embodiment of the present invention. FIG. 9 is a more detailed description of step 716 in FIG. 7. In particular, the process in FIG. 9 examines a video data packet for a synchronization factor. The process begins by obtaining a start code from the video data packet (step 900). In MPEG data streams, a start code is as follows: 000001 B3. The "000001" indicates a start code while the "B3" indicates a sequence header, the synchronization factor. A determination is made as to whether a sequence header is present in the start code (step 902). If a sequence header is present in the start code, the process then saves the location of the sequence header (step 904) and sets a sequence header found flag (step 906). Then a determination is made as to whether more data is present (step 908). The process proceeds directly to step 908 from step 902 if a sequence header is not found in the start code. If more data is present, the process then returns to step 900 to obtain another start code. Otherwise, a determination is made as to whether the sequence header found flag has been set (step 910). If the flag is set, the packet size is readjusted so that the data starts right before the synchronization factor (step 912). The process then returns a true indication, indicating that a sequence header has been found (step 914). Otherwise, the process returns a false indication, indicating that a sequence header has not been found (step 918).

Figure 10:
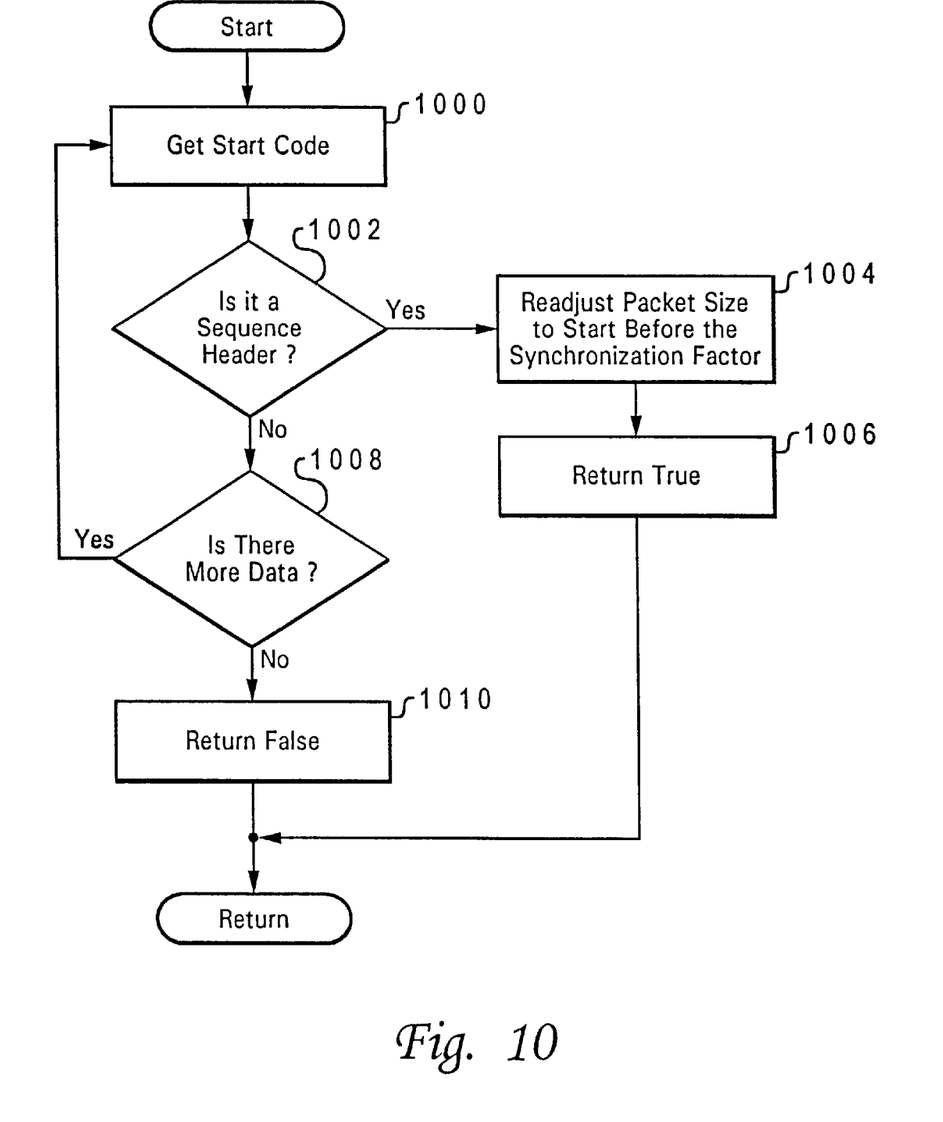
FIG. 10 is a flowchart of a process for examining a video data packet for the first synchronization factor in accordance with a preferred embodiment of the present invention.

Turning next to FIG. 10, a flowchart of a process for examining a video data packet for a synchronization factor is depicted in accordance with a preferred embodiment of the present invention. FIG. 10 is a more detailed description of step 808 in FIG. 8. In particular, the process in FIG. 10 examines a video data packet for a presence of a synchronization factor in the form of a sequence header. The process begins by obtaining the start code in the video data packet (step 1000). A determination is made as to whether the start code is a sequence header (step 1002). If the start code is a sequence header, the packet size is readjusted to start right before the synchronization factor (step 1004). Then, a true indication is returned (step 1006). Otherwise, a determination is made as to whether more data is present (step 1008). If more data is present, the process returns to step 1000 to obtain another start code. If more data is not present, the process then returns a false indication (step 1010).

Figure 11:
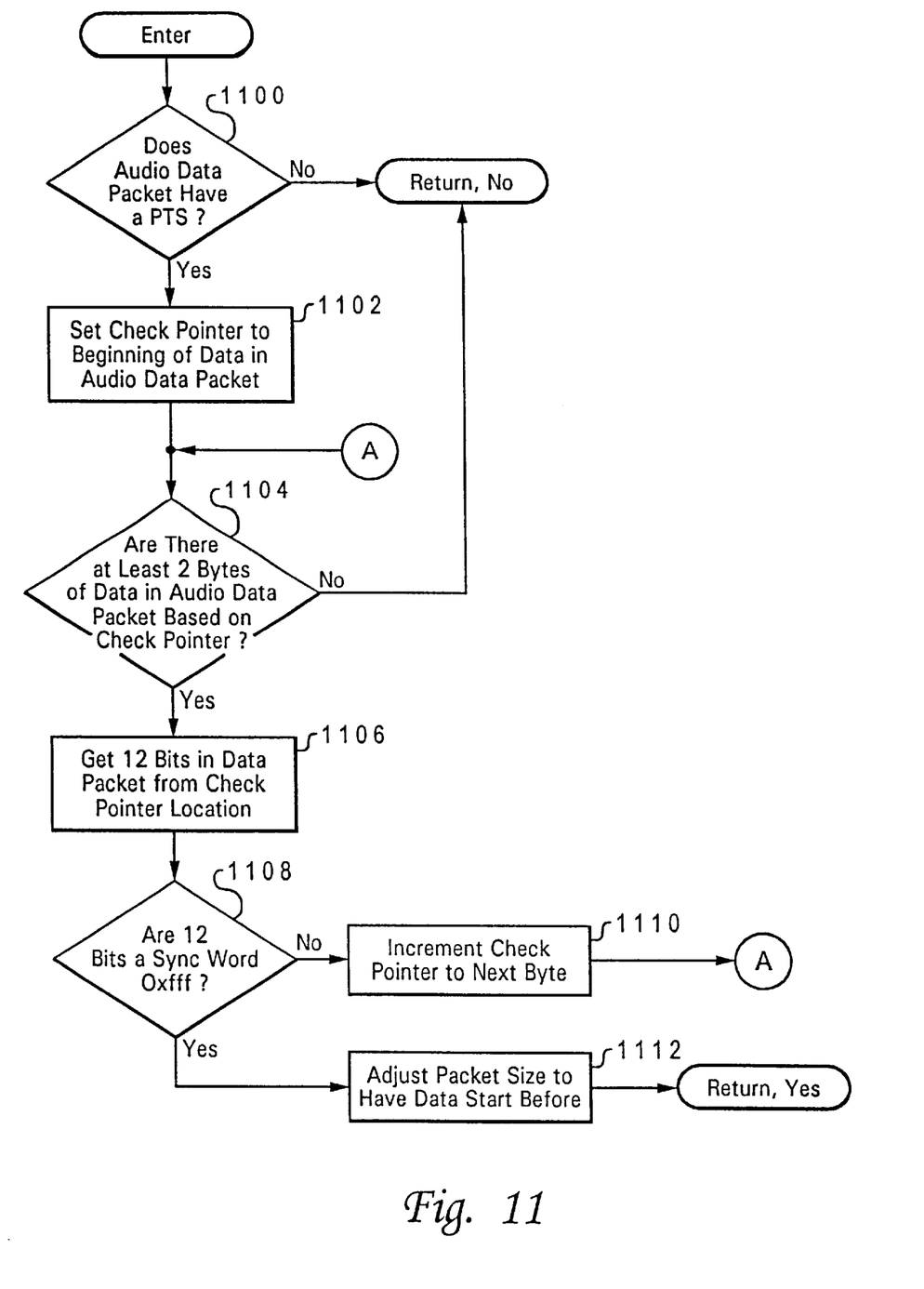
FIG. 11 is a flowchart of a process for finding the audio synchronization factor in an audio data packet in accordance with a preferred embodiment of the present invention.

With reference now to FIG. 11, a flowchart of a process for identifying whether an audio synchronization factor is present in accordance with a preferred embodiment of the present invention. This flowchart is a more detailed flowchart of steps 616 in FIG. 6, 708 in FIG. 7, and 816 in FIG. 8, which determines whether an audio synchronization factor is present in an audio data packet. The process begins by determining whether the audio data packet has a presentation time stamp (PTS) (step 1100). PTSs are found in MPEG data streams. If a PTS is not found in the data packet, a no is returned. Otherwise, a check pointer is set to the beginning of the data in the audio data packet (step 1102). A determination is then made as to whether at least two bytes of data in the audio data packet are present based on the check pointer (step 1104). Two bytes of data are needed to perform a check to see if a sync word is present in the audio data packet because the check for a sync word examines 12 bits or 1.5 bytes of data. If at least two bytes of data are not present, the process returns a no. Otherwise, twelve bits in the audio data packet are obtained from the check pointer location (step 1106). Then, a determination is made as whether the twelve bits are a sync word "0xfff" (step 1108). If the twelve bits are not a sync word, the process increments the check pointer to the next byte (step 1110) and then returns to step 1104 as previously described. Otherwise, the packet size is adjusted to having the data start before the sync word (step 1112) with the process then returning a yes.

When a start point is found after examining audio data packets and video data packets using the process of the present invention, the start point is then used by the data processing system to begin presentation of the audio and video data. Although the processes of the present invention may be used to check the data stream as it is being presented or played, other known mechanisms using data, such as presentation time stamps in MPEG, may be employed to maintain synchronization in the presentation of audio and video data after the data stream has been correctly started using the processes of the present invention. The processes of the present invention may be used each time a video stream is started. These processes are especially useful when a data stream is stopped and started again.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted embodiment was described with reference to an MPEG data stream, the processes of the present invention may be applied to other types of audio/video data streams containing synchronization factors. The embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for locating a correct synchronization point in a data stream containing plurality of video data packets and a plurality of audio data packets, the method comprising the data processing system implemented steps of:

monitoring a data stream for an audio synchronization factor in an audio data packet within the plurality of audio data packets in the data stream and for a video synchronization factor within a video data packet within the plurality of video data packets in the data stream;

examining a first audio data packet from the plurality of audio data packets after a video data packet to determine whether the first audio data packet contains an audio synchronization factor in response to detecting a video synchronization factor in the video data packet;

examining a data packet immediately after an audio data packet to determine whether the data packet is a video data packet containing a video synchronization factor in response to detecting an audio synchronization factor in the audio data packet;

identifying the correct synchronization point as being in the video data packet in response to detecting an audio synchronization factor in the first audio data packet after the video data packet containing the video synchronization factor; and identifying the correct synchronization point as being in the audio data packet in response to detecting the video synchronization factor in a video data packet immediately after the audio data packet.

2. The method of claim 1 further comprising:

setting a start point in the data packet containing the correct synchronization point.

3. The method of claim 2, wherein the data packet is a video data packet containing a video synchronization factor and wherein the step of setting a start point at the video data packet comprises discarding all data in the video data packet located before the video synchronization factor.

4. The method of claim 2, wherein the data packet is an audio packet containing an audio synchronization factor and wherein the step of setting a start point in the audio data packet comprises discarding all data in the audio data packet located before the audio synchronization factor.

5. The method of claim 2, wherein the data packet is a video data packet containing a video synchronization factor and wherein the step of setting a start point in the video data packet comprises setting the start point immediately before the video data packet containing the video synchronization factor.

6. The method of claim 2, wherein the data packet is an audio data packet containing an audio synchronization factor and wherein the step of setting a start point in the audio data packet comprises setting the start point immediately before the audio data packet containing the audio synchronization factor.

7. The method of claim 1, wherein the audio synchronization factor within an audio data packet is a sync word located in a packet header within the audio data packet.

8. The method of claim 1, wherein the video synchronization factor within a video data packet is a sequence header located within the video data packet.

9. The method of claim 1, wherein two video data packets are located between the video data packet containing the video synchronization factor and the first audio data packet after the video data packet containing the video synchronization factor.

10. The method of claim 1, wherein the data stream is an MPEG data stream.

11. The method of claim 1, wherein the step of identifying the correct synchronization point as being in the video data packet comprises:

determining whether a plurality of multiple synchronization factors are present within the video data packet; and in response to a determination that a plurality of synchronization factors are present in the video data packet, identifying the correct synchronization point as being a last synchronization factor within the plurality of synchronization factors.

12. The method of claim 1, wherein the step of identifying the correct synchronization point as being in the audio data packet comprises:

determining whether a plurality of multiple synchronization factors are present within the audio data packet; and in response to a determination that a plurality of synchronization factors are present in the video data packet, identifying the correct synchronization point as being a first synchronization factor within the plurality of synchronization factors.

13. A method in a data processing system for locating a correct synchronization point in a data stream containing a plurality of data packets, wherein the plurality of data packets include video data packets and audio data packets, the method comprising:

identifying a first data packet within the plurality of data packets;

checking the first data packet for an audio synchronization factor in response to the first data packet being identified as an audio data packet;

checking the first data packet for a video synchronization factor in response to the first data packet being identified as a video data packet;

setting a start point at the audio data packet and determining whether a data packet immediately after the audio data packet contains a video synchronization factor in response to detecting an audio synchronization factor in the audio data packet;

setting a start point at the video data packet and determining whether a first audio data packet after the video data packet contains an audio synchronization factor;

discarding the start point set at the audio data packet in response to a determination that the data packet immediately after the audio data packet is not a video data packet containing a video synchronization point; and discarding the start point at the video data packet in response to a determination that an audio synchronization factor is absent from the first audio data packet after the video data packet.

14. The method of claim 13, wherein the first data packet is a video data packet including multiple synchronization factors including a last synchronization factor, wherein the step of setting the start point at the video data packet comprises discarding data prior to the last synchronization factor.

15. The method of claim 13 further comprising:
monitoring for another synchronization factor in video data packets located after the video data packet to which the start point was set and prior to the first audio data packet; and
resetting the start point to a video data packet, containing another video synchronization factor, prior to the first audio data packet in response to locating the another video synchronization factor.

16. A data processing system for locating a correct synchronization point in a data stream containing a plurality of video data packets and a plurality of audio data packets, the data processing system comprising:
monitoring means for monitoring a data stream for an audio synchronization factor in an audio data packet within the plurality of audio data packets in the data stream and for a video synchronization factor within a video data packet within the plurality of video data packets in the data stream;
first examination means for examining a first audio data packet from the plurality of audio data packets after a video data packet to determine whether the first audio data packet contains an audio synchronization factor in response to detecting a video synchronization factor in the video data packet;
second examination means for examining a data packet immediately after an audio data packet to determine whether the data packet is a video data packet containing a video synchronization factor in response to detecting an audio synchronization factor in the audio data packet;
first identification means for identifying the correct synchronization point as being in the video data packet in response to detecting an audio synchronization factor in the first audio data packet after the video data packet containing the video synchronization factor; and
second identification means for identifying the correct synchronization point as being in the audio data packet in response to detecting the video synchronization factor in a video data packet immediately after the audio data packet.

17. The data processing system of claim 16 further comprising:
setting means for setting a start point in the data packet containing the correct synchronization point.

18. The data processing system of claim 16, wherein the data packet is a video data packet containing a video synchronization factor and wherein setting means includes means for discarding all data in the video data packet located before the video synchronization factor.

19. The data processing system of claim 17, wherein the data packet is an audio data packet containing an audio synchronization factor and wherein the setting means includes means for discarding all data in the audio data packet located before the audio synchronization factor.

20. The data processing system of claim 17, wherein the data packet is a video data packet containing a video synchronization factor and wherein the setting means includes means for setting the start point at the video data packet containing the video synchronization factor.

21. The data processing system of claim 17, wherein the data packet is an audio data packet containing an audio synchronization factor and wherein the setting means includes means for setting the start point at the audio and data packet containing the audio synchronization factor.

22. The data processing system of claim 16, wherein the audio synchronization factor within an audio data packet is a sync word located in a packet header within the audio data packet.

23. The data processing system of claim 16, wherein the video synchronization factor within a video data packet is a sequence header located within the video data packet.

24. The data processing system of claim 16, wherein two video data packets are located between the video data packet containing the video synchronization factor and the first audio data packet after the video data packet containing the video synchronization factor.

25. The data processing system of claim 16, wherein the data stream is an MPEG data stream.

26. The data processing system of claim 16, wherein the first identification means comprises:
first means for determining whether a plurality of multiple synchronization factors are present within the video data packet; and
second means, responsive to a determination that a plurality of synchronization factors are present in the video data packet, for identifying the correct synchronization point as being a last synchronization factor within the plurality of synchronization factors.

27. The data processing system of claim 16, wherein the second identification means comprises:
first means for determining whether a plurality of multiple synchronization factors are present within the audio data packet; and
second means, responsive to a determination that a plurality of synchronization factors are present in the video data packet, for identifying the correct synchronization point as being a first synchronization factor within the plurality of synchronization factors.

28. A data processing system for locating a correct synchronization point in a data stream containing a plurality of data packets, wherein the plurality of data packets include video data packets and audio data packets, the data processing system comprising:
identification means for identifying a first data packet within the plurality of data packets;
first checking means for checking the first data packet for an audio synchronization factor in response to the first data packet being identified as an audio data packet;
second checking means for checking the first data packet for a video synchronization factor in response to the first data packet being identified as a video data packet;
first setting means for setting a start point at the audio data packet and determining whether a data packet immediately after the audio data packet containing video synchronization factor in response to detecting an audio synchronization factor in the audio data packet;
second setting means for setting a start point at the video data packet and determining whether a first audio data packet after the video data packet contains an audio synchronization factor;
first discard means for discarding the start point set at the audio data packet in response to a determination that the data packet immediately after the audio data packet is not a video data packet containing a video synchronization point; and
second discard means for discarding the start point at the video data packet in response to a determination that an audio synchronization factor is absent from the first audio data packet after the video data packet.

29. A multimedia adapter comprising:
input means for receiving a multimedia data stream including audio and video data;
parsing means for parsing the multimedia data stream into audio data packets and video data packets;

identification means for identifying a first data packet within the plurality of data packets;

first checking means for checking the first data packet for an audio synchronization factor in response to the first data packet being identified as an audio data packet;

second checking means for checking the first data packet for a video synchronization factor in response to the first data packet being identified as a video data packet;

first setting means for setting a start point at the audio data packet and determining whether a data packet immediately after the audio data packet contains a video synchronization factor in response to detecting an audio synchronization factor in the audio data packet;

second setting means for setting a start point at the video data packet and determining whether a first audio data packet after the video data packet contains an audio synchronization factor;

first discard means for discarding the start point set at the audio data packet in response to a determination that the data packet immediately after the audio data packet is not a video data packet containing a video synchronization point; and second discard means for discarding the start point at the video data packet in response to a determination that an audio synchronization factor is absent from the first audio data packet after the video data packet.

30. A computer program product for use with a data processing system for locating a correct synchronization point in a data stream containing a plurality of video data packets and a plurality of audio data packets, the computer program product comprising:

a computer usable medium;

first instructions for identifying a first data packet within the plurality of data packets;

second instructions for checking the first data packet for an audio synchronization factor in response to the first data packet being identified as an audio data packet;

third instructions for checking the first data packet for a video synchronization factor in response to the first data packet being identified as a video data packet;

fourth instructions for setting a start point at the audio data packet and determining whether a data packet immediately after the audio data packet contains a video synchronization factor in response to detecting an audio synchronization factor in the audio data packet;

fifth instructions for setting a start point at the video data packet and determining whether a first audio data packet after the video data packet contains an audio synchronization factor;

sixth instructions for discarding the start point set at the audio data packet in response to a determination that the data packet immediately after the audio data packet is not a video data packet containing a video synchronization point; and seventh instructions for discarding the start point at the video data packet in response to a determination that an audio synchronization factor is absent from the first audio data packet after the video data packet, wherein the instructions are embodied within the computer usable medium.

\* \* \* \* \*

UNITED STATES PATENT AND TRADEMARK OFFICE
CERTIFICATE OF CORRECTION

| | |
|---|---|
| PATENT NO. | : 6,249,319 B1 |
| DATED | : June 19, 2001 |
| INVENTOR(S) | : Post |

It is certified that error appears in the above-identified patent and that said Letters Patent is hereby corrected as shown below:

<u>Column 7,</u>
Line 56, delete "918", and insert -- 916 --.

<u>Column 9,</u>
Line 10, insert -- a -- before "plurality".

Signed and Sealed this

Thirtieth Day of April, 2002

Attest:

JAMES E. ROGAN
*Attesting Officer*   *Director of the United States Patent and Trademark Office*